United States Patent
Nguyen

(10) Patent No.: US 10,255,528 B1
(45) Date of Patent: Apr. 9, 2019

(54) SENSOR FUSION FOR LANE DEPARTURE BEHAVIOR DETECTION

(71) Applicant: Lytx, Inc., San Diego, CA (US)

(72) Inventor: Vincent Nguyen, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 0 days.

(21) Appl. No.: 15/833,209

(22) Filed: Dec. 6, 2017

(51) Int. Cl.
| | |
|---|---|
| *A61B 5/18* | (2006.01) |
| *G06K 9/62* | (2006.01) |
| *G06K 9/00* | (2006.01) |
| *B60Q 9/00* | (2006.01) |
| *G06N 3/04* | (2006.01) |
| *G06N 3/08* | (2006.01) |

(52) U.S. Cl.
CPC ............ *G06K 9/6293* (2013.01); *B60Q 9/00* (2013.01); *G06K 9/00798* (2013.01); *G06K 9/6256* (2013.01); *G06K 9/00845* (2013.01); *G06N 3/04* (2013.01); *G06N 3/08* (2013.01)

(58) Field of Classification Search
CPC ...... G07C 5/008; G07C 5/085; G07C 5/0825; G07C 5/0891; G07C 5/02; G07C 5/0866; G07C 5/06; G07C 5/08; G07C 5/0808; G08G 1/167; G08G 1/0112; G08G 1/16; G08G 1/20; G08G 1/162; G08G 1/164
USPC ....... 340/439, 438, 902, 905, 441, 446, 463, 340/467, 488, 519, 539.12, 539.22, 340/539.26, 568.1, 691.6
See application file for complete search history.

(56) References Cited

U.S. PATENT DOCUMENTS

| | | | | |
|---|---|---|---|---|
| 2011/0109475 | A1* | 5/2011 | Basnayake | G08G 1/096716 340/902 |
| 2012/0206252 | A1* | 8/2012 | Sherony | B60W 30/12 340/438 |
| 2013/0151058 | A1* | 6/2013 | Zagorski | B60W 30/09 701/23 |
| 2015/0088335 | A1* | 3/2015 | Lambert | G08G 1/162 701/1 |
| 2015/0092056 | A1* | 4/2015 | Rau | G08G 1/167 348/148 |
| 2017/0109644 | A1* | 4/2017 | Nariyambut Murali | G06N 7/005 |
| 2017/0327123 | A1* | 11/2017 | Tokimasa | B60W 40/04 |
| 2017/0341647 | A1* | 11/2017 | Rajvanshi | B60W 30/14 |

* cited by examiner

*Primary Examiner* — Daniel Previl
(74) *Attorney, Agent, or Firm* — Van Pelt, Yi & James LLP

(57) ABSTRACT

A system for identifying an inappropriate driving behavior includes an interface and a processor. The interface is configured to receive a first sensor data from a first vehicle sensor and receive a second sensor data from a second vehicle sensor. The processor is configured to combine the first sensor data and the second sensor data to determine a combined sensor data set, determine a lane departure behavior based at least in part on the combined sensor data set using a model, and store a bad behavior indication in a database system in response to the lane departure behavior indicating a bad behavior.

20 Claims, 8 Drawing Sheets

SENSOR FUSION FOR LANE DEPARTURE BEHAVIOR DETECTION

BACKGROUND OF THE INVENTION

Modern vehicles (e.g., airplanes, boats, trains, cars, trucks, etc.) can include a lane departure system. These systems produce a signal that indicates a departure from a lane. However, this signal is inherently noisy as even under normal driving circumstances a vehicle will depart a lane. For example, a change of lane, passing a vehicle, and turning all depart a lane and do not necessarily represent bad driving behavior. Thus, it is a difficult problem to determine just from a lane departure indication whether the driving behavior was appropriate or inappropriate from the lane departure sensor information.

BRIEF DESCRIPTION OF THE DRAWINGS

Various embodiments of the invention are disclosed in the following detailed description and the accompanying drawings.

DETAILED DESCRIPTION

Figure 1:
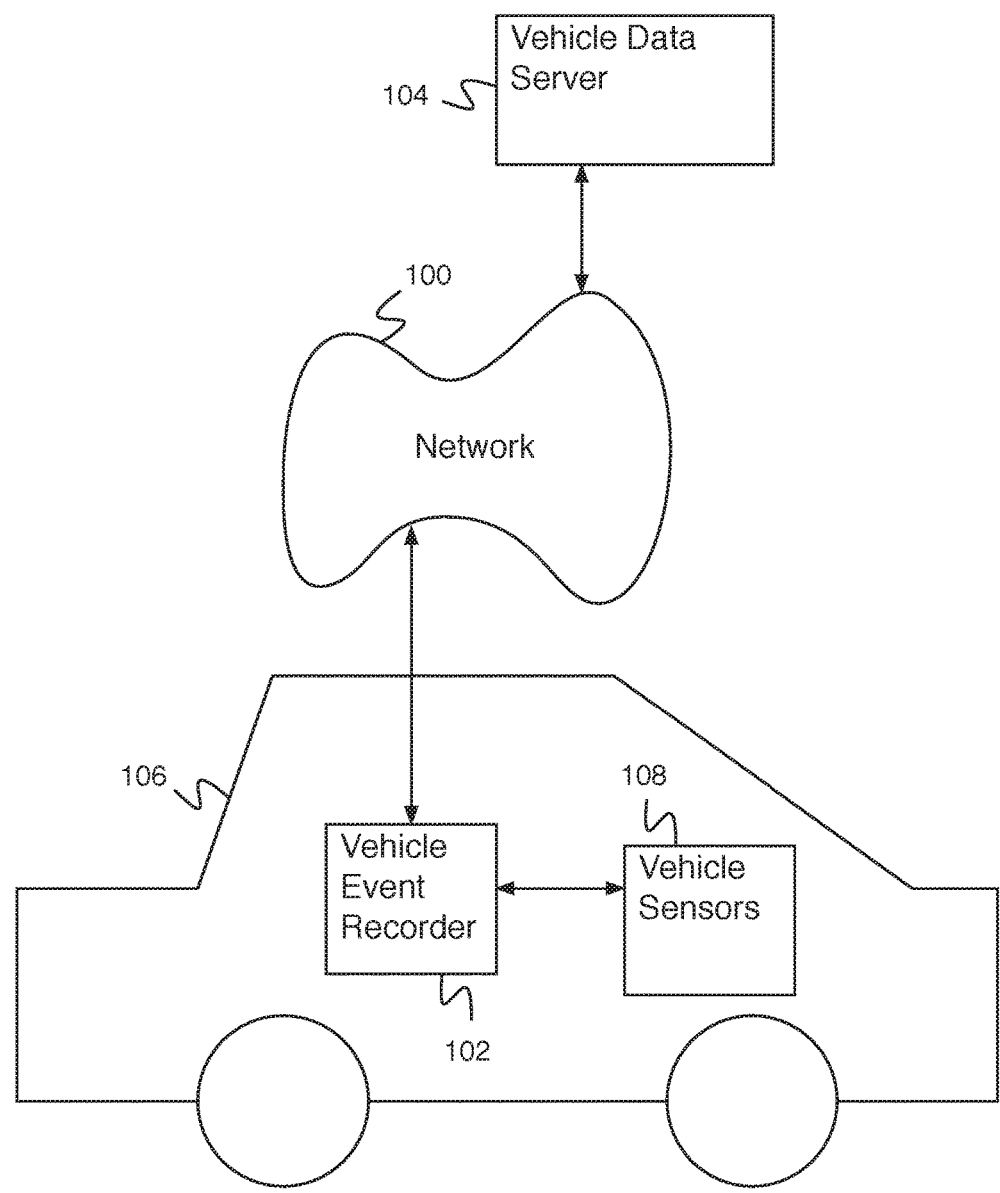
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for identifying an inappropriate driving behavior is disclosed. The system comprises an interface and a processor. The interface is configured to receive a first sensor data from a first vehicle sensor and receive a second sensor data from a second vehicle sensor. The processor is configured to combine the first sensor data and the second sensor data to determine a combined sensor data set, determine a lane departure behavior based at least in part on the combined sensor data set using a model, and store a bad behavior indication in a database system in response to the lane departure behavior indicating a bad behavior. The system for identifying an inappropriate driving behavior additionally comprises a memory coupled to the processor and configured to provide the processor with instructions.

A system for identifying an inappropriate driving behavior comprises a vehicle event recorder coupled to a plurality of sensors. The vehicle event recorder has an interface, a processor, and a memory, and is the processor of the vehicle event recorder is configured to receive data, process data, communicate using a network, etc. Sensors coupled to or directly a part of the vehicle event recorder comprise global positioning systems (e.g., GPS), video image sensors, audio sensors, radio detection and ranging systems (e.g., RADAR), light detection and ranging systems (e.g., LIDAR), accelerometers, etc. The vehicle event recorder processor is configured to receive a first sensor data from a first vehicle sensor, receive a second sensor data from a second vehicle sensor, and combine the first sensor data and the second sensor data to determine a combined sensor data set. Combining the first sensor data and the second sensor data can include merging the first sensor data and the second sensor data, processing the first sensor data or the second sensor data using a Kalman filter, computing statistics of the first sensor data or the second sensor data, etc. A model is then used to determine a lane departure behavior based at least in part on the combined sensor data set. The model can be an analytical model, a neural network, a machine learning model, etc. The vehicle event recorder is then configured to store a bad behavior indication in a database system in response to the lane departure behavior indicating a bad behavior. In addition, the vehicle event recorder can be configured to alert a driver using an audio alert, alert a driver using a haptic alert, alert a manager, modify a driver score, modify warning thresholds, modify event detection thresholds, etc., in response to the lane departure behavior indicating the bad behavior. The lane departure behavior may comprise one or more bad behavior indication types, for example, using a handheld cell phone, using a hands free cell phone, eating, drinking, drowsy, falling asleep, or spacing out.

The vehicle event recorder is additionally configured to train the model. Training the model comprises providing the model with a set of labeled data sets. For example, a labeled data set comprises a data set determined by combining a first sensor data and a sensor data to determine a combined data set. The combined data set is manually processed to determine a label. For example, the combined data set is viewed by a human reviewer. The human reviewer applies one or more labels to the combined data set. The labels comprise bad behavior indication types, for example, using a handheld cell phone, using a hands free cell phone, eating, drinking, drowsy, falling asleep, or spacing out. If necessary, the set of labeled data sets comprises a large number of data sets.

When the vehicle event recorder determines, based on sensor data from a sensor, that a lane departure event has occurred, it is advantageous to determine whether the lane departure event occurred as a result of a bad behavior. The system for identifying an inappropriate driving behavior is able to utilize a model trained on manually labeled sensor data sets to determine bad behavior based on a combined data set (e.g., a data set created by combining sensor data from two or more vehicle sensors).

FIG. 1 is a block diagram illustrating an embodiment of a system including a vehicle event recorder. In the example shown, when vehicle 106 travels, vehicle sensors 108 capture sensor data (e.g., video data, audio data, RADAR data, LIDAR data, accelerometer data, etc.). The sensor data is received by vehicle event recorder 102. Vehicle event recorder 102 uses the data to determine events (e.g., collision events, hazardous maneuver events, distracted driving events, etc.). When the vehicle event recorder 102 determines a lane departure event, it begins a process for identifying whether an inappropriate driving behavior is associated with the lane departure event. This association can be used to determine whether the lane departure event was potentially caused by an inappropriate driving behavior. A lane departure event comprises a determination that the vehicle departed from its correct position in the lane. For example, the vehicle swerved off center, the vehicle failed to track a corner correctly, the vehicle hit the lane marker, etc. A lane departure event may be a simple minor driver error, or it may be caused by an inappropriate behavior that can be corrected. For example, it may be determined that the driver departed the lane because of distraction from talking on a cell phone. Vehicle event recorder 102 comprises a model for determining a lane departure behavior based at least in part on a combined sensor data set (e.g., the model was trained to provide an indication of whether the driving behavior is bad based on a combined set of sensor inputs). A combined sensor data set comprises a data set comprising data from at least a first sensor and a second sensor. When a lane departure event is determined, the vehicle event recorder receives first sensor data and second sensor data, combines them to determine a combined sensor data set, and determines lane departure behavior (e.g., whether a high likelihood of the lane departure event is associated with bad behavior) based at least in part on the combined sensor data using a model. Then, a bad behavior indication is stored in a database system in response to the lane departure behavior indicating a bad behavior.

Vehicle event recorder 102 comprises a vehicle event recorder mounted in a vehicle (e.g., a car or truck). Vehicle event recorder 102 is in communication with vehicle sensors 108. Vehicle sensors 108 comprises a set of sensors, for example, one or more video recorders, audio recorders, accelerometers, gyroscopes, vehicle state sensors, proximity sensors, a global positioning system (e.g., GPS), outdoor temperature sensors, moisture sensors, laser line tracker sensors, etc. Vehicle state sensors comprise internal vehicle state sensors—for example, a speedometer, an accelerator pedal sensor, a brake pedal sensor, an engine revolutions per minute (e.g., RPM) sensor, an engine temperature sensor, a headlight sensor, an airbag deployment sensor, driver and passenger seat weight sensors, an anti-locking brake sensor, traction control system sensors, drive wheel speed sensors, shocks sensors, an engine exhaust sensor, a gear position sensor, a cabin equipment operation sensor, etc. Vehicle event recorder 102 comprises a system for receiving and processing sensor data. Processing sensor data comprises filtering data, identifying patterns in data, detecting events, etc. Vehicle event recorder 102 is mounted on vehicle 106 in any appropriate location, for example the chassis, the front grill, the dashboard, the rear-view mirror, the rear window or wall, the floor, etc. There are times when vehicle event recorder 102 comprises multiple units mounted in different locations within vehicle 106 instead of a single unit, particularly when there are space constraints for a given location (e.g., behind the rear view mirror) and more space is required to house electronic components. Vehicle event recorder 102 comprises a communications system for communicating with network 100. Network 100 comprises a network for communications. Network 100 comprises one or more of a wireless network, a wired network, a cellular network, a Code Division Multiple Access (CDMA) network, a Global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a local area network, a wide area network, the Internet, etc. There are instances when network 100 comprises multiple networks, for instance, multiple interconnected networks spanning different regions, networks operating at different times, overlaid networks with different access permissions, networks with different bandwidth, etc. Different networks comprising network 100 typically comprise different bandwidth cost (e.g., a wired network has a very low cost, a wireless Ethernet connection has a moderate cost, a cellular data network has a high cost). In some embodiments, network 100 has a different cost at different times (e.g., a higher cost during the day and a lower cost at night). Vehicle event recorder 102 communicates with vehicle data server 104 via network 100.

Figure 2:
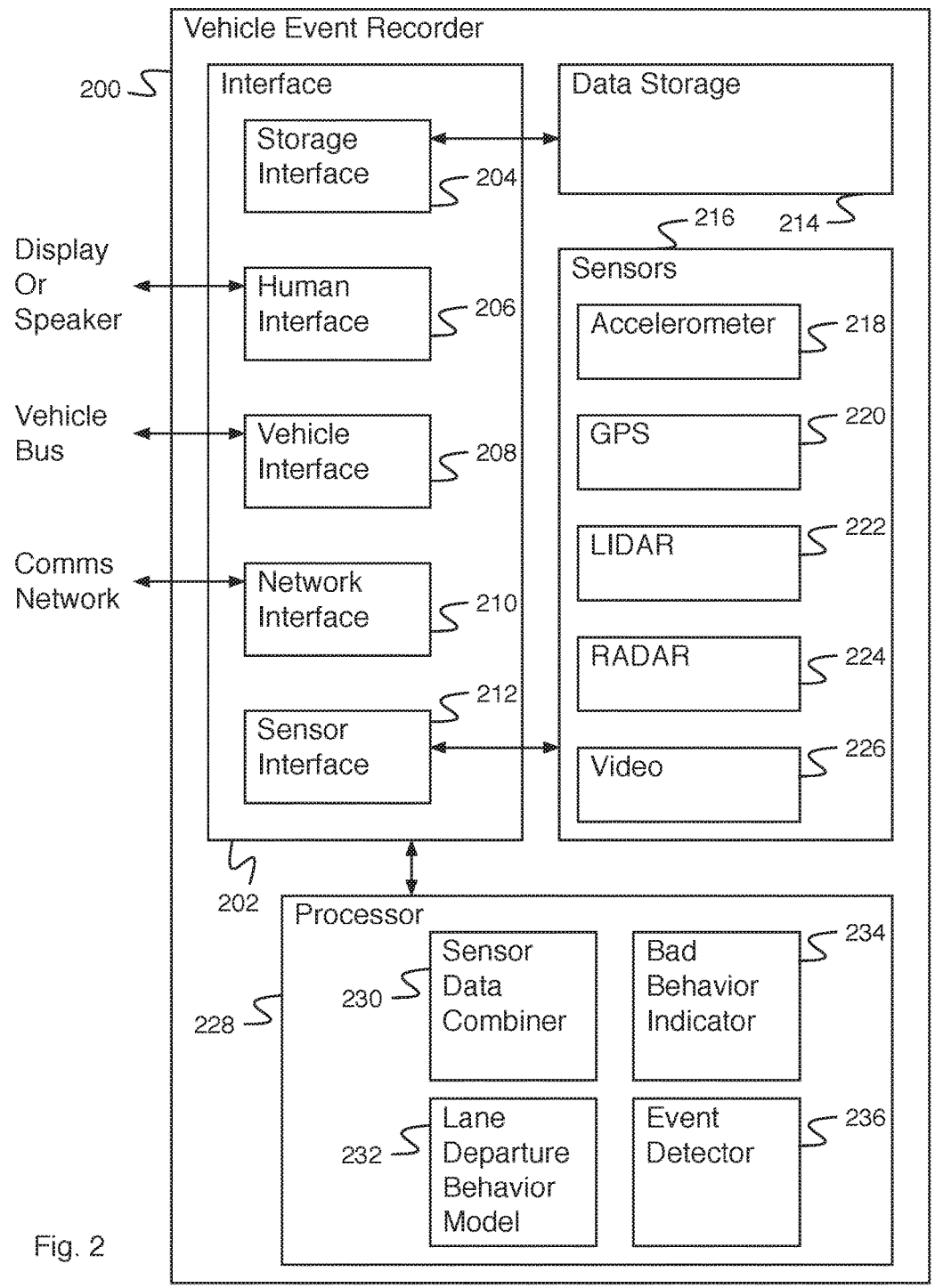
FIG. 2 is a block diagram illustrating an embodiment of a vehicle event recorder.

FIG. 2 is a block diagram illustrating an embodiment of a vehicle event recorder. In some embodiments, vehicle event recorder 200 of FIG. 2 comprises vehicle event recorder 102 of FIG. 1. In the example shown, vehicle event recorder 200 monitors sensor signals from internal sensors 216 (e.g., accelerometer 218, global position sensor (GPS) 220, laser detection and ranging (e.g., LIDAR) 222, radio detection and ranging (e.g., RADAR) 224, video sensor 226) or from vehicle sensors via vehicle interface 208. In some embodiments, LIDAR 222 sensor is external to vehicle event recorder. In some embodiments, RADAR 224 sensor is external to vehicle event recorder.

Sensor data from one or more sensors of sensors 216 and/or one or more sensors associated with the vehicle (e.g., as input via vehicle interface 208) is combined using sensor data combiner 230 to determine a combined data set. Combining sensor data from two or more sensors comprises merging the data sets to form a single set, processing a data set, filtering a data set, computing a statistic of a data set, etc. The combined data set is provided to lane departure behavior model 232. Lane departure behavior model 232 comprises a model for determining a lane departure behavior based on the combined data set. A lane departure behavior may indicate a bad behavior, for example, using a handheld cell phone, using a hands free cell phone, eating, drinking, drowsy, falling asleep, or spacing out. A lane departure behavior additionally may not indicate a bad behavior, for example, indicating that the lane departure was not caused by a bad behavior. Bad behavior indicator 234 comprises an indicator for indicating a bad behavior in response to the lane departure behavior indicating a bad behavior. Bad behavior indicator 234 stores a bad behavior indication in a database system in response to the lane departure behavior indicating a bad behavior. The database system comprises a database on data storage 214, a database accessed via network interface 210, etc. Bad behavior indicator 234 provides other bad behavior indications in response to the lane departure behavior indicating a bad behavior when appropriate, for example, bad behavior indicator 234 can alert a driver using an audio alert, alert a driver using a haptic alert, alert a manager, modify a driver score, modify warning thresholds, modify event detection thresholds (e.g., indicate to event detector 236 to modify event detection thresholds), etc.

Vehicle event recorder 200 communicates with a vehicle data server using network interface 210 (e.g., using a wired or wireless network such as a WiFi™ or cellular network). Vehicle event recorder 200 transmits sensor data, vehicle data, vehicle identification data, anomalous event data, driver quality data, etc. to the vehicle data server. Vehicle event recorder 200 comprises interface 202. Interface 202 comprises a set of interfaces to other systems. Human interface 206 comprises an interface to a human interaction system—for example, an audio output (e.g., a speaker), a display output, a haptic output, etc. Sensor interface 212 comprises an interface to one or more sensors for receiving sensor data. Sensor interface 212 comprises an interface to one or more vehicle event recorder sensors. In various embodiments, vehicle event recorder sensors comprise an exterior video camera, an exterior still camera, an interior video camera, an interior still camera, a microphone, an accelerometer, a gyroscope, an outdoor temperature sensor, a moisture sensor, a laser line tracker sensor, or any other appropriate sensors. Vehicle interface 208 interfaces with vehicle state sensors possibly including a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, shocks sensors, an engine exhaust sensor, a gear position sensor, a turn signal sensor, a cabin equipment operation sensor, or any other appropriate vehicle state sensors. In some embodiments, vehicle interface 208 comprises a connection to a vehicle bus such as an on-board diagnostics (OBD) bus (e.g., society of automotive engineers (SAE) J1939, J1708/J1587, OBD-II, CAN BUS, etc.). In some embodiments, vehicle event recorder 200 communicates with vehicle state sensors via the OBD bus.

Vehicle interface 208 further comprises an interface to one or more vehicle systems (e.g., for adjusting vehicle control parameters, for putting the vehicle in a safe mode, etc.). Network interface 210 comprises a network interface for communicating with other systems via a network. Network interface 210 comprises one or more of a GSM interface, a CDMA interface, an LTE interface, a WiFi interface, an Ethernet interface, a Universal Serial Bus (USB) interface, a Bluetooth™ interface, an Internet interface, etc. Processor 228 comprises a processor for controlling the operations of vehicle event recorder 200, for reading and writing information on data storage 214, for reading and/or writing data via interface 202, etc. Processor 228 comprises event detector 236 for determining events (e.g., collision events, hazardous maneuver events, distracted driving events, etc.).

Data storage 214 comprises a data storage (e.g., a random access memory (RAM), a read only memory (ROM), a nonvolatile memory, a flash memory, a hard disk, or any other appropriate data storage). Data storage 214 stores clips or continuous stream(s) of video from video 226. Event detector 236 is used to detect events and flag or mark in an index for the clips or within the continuous stream(s) of video. Data storage 214 comprises a data storage for storing instructions for processor 222, vehicle event recorder data, vehicle event data, sensor data, video data, driver scores, vehicle information, vehicle identifying information, anomalous event information, driver quality information, bad behavior indications, etc.

Figure 3:
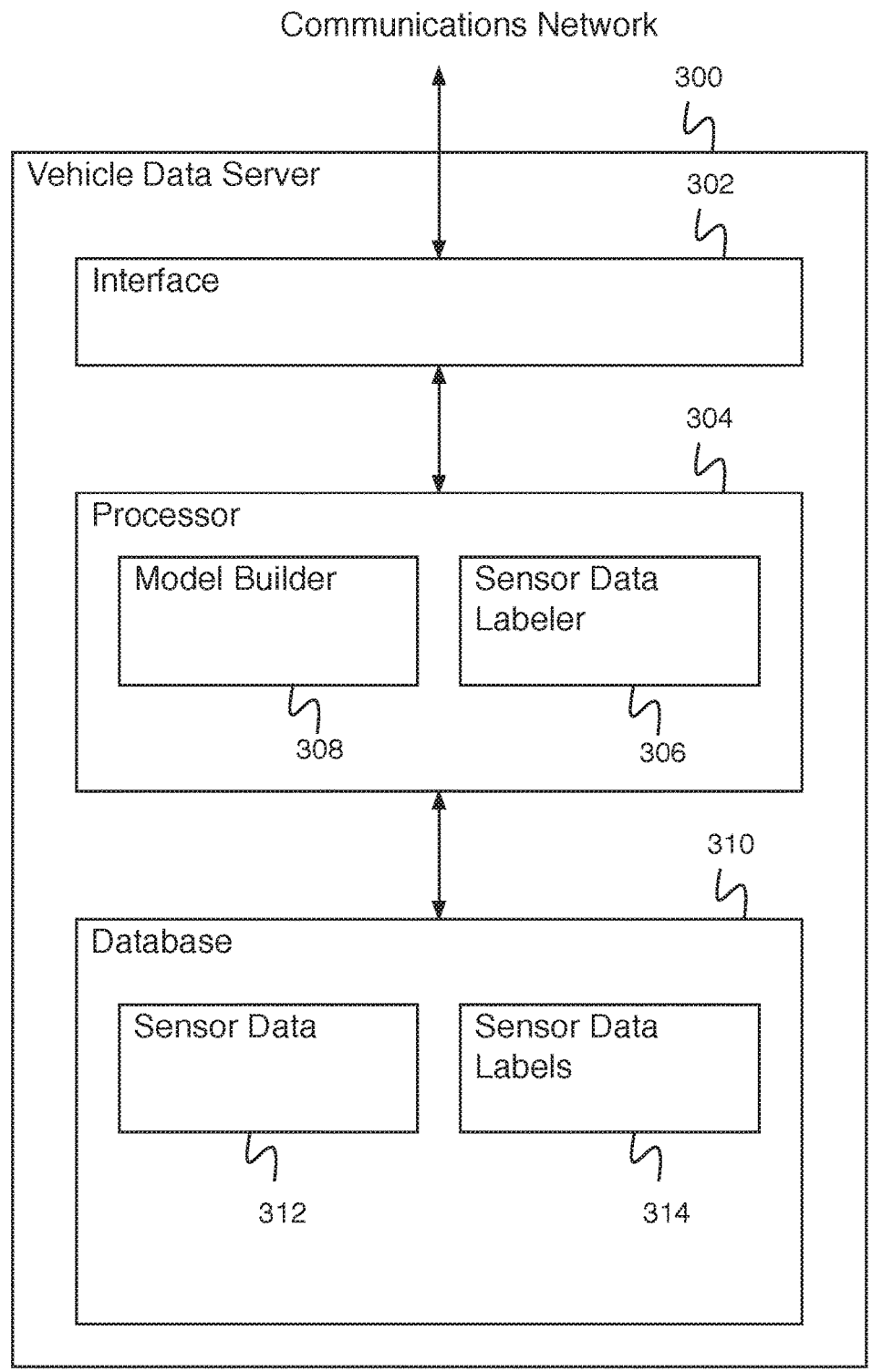
FIG. 3 is a block diagram illustrating an embodiment of a vehicle data server.

FIG. 3 is a block diagram illustrating an embodiment of a vehicle data server. In some embodiments, vehicle data server 300 comprises vehicle data server 104 of FIG. 1. In the example shown, vehicle data server 300 receives via a communications network using interface 302 vehicle data information including event data, sensor data, vehicle information, and raw data associated with a vehicle with a mounted vehicle event recorder. Received sensor data is stored in database 308. Sensor data comprises data from a single sensor, data from a plurality of sensors, processed sensor data, merged sensor data, etc. Sensor data labeler 306 of processor 304 labels sensor data. Sensor data labels associated with sensor data by sensor data labeler 306 are additionally stored in database 308.

Sensor data labeler 306 comprises a system for labeling sensor data with one or more bad behavior events—for example, using a handheld cell phone, using a hands free cell phone, eating, drinking, drowsy, falling asleep, or spacing out. In some embodiments, sensor data labeler 306 comprises an automatic sensor data labeler, for example, comprising an automatic algorithm requiring a large amount of processing capacity (e.g., processor 304 is much more powerful than a processor that can be incorporated into a vehicle event recorder). In some embodiments, sensor data labeler 306 comprises or is in communication with (e.g., via interface 302) a manual sensor data labeler—for example, a user system for providing a user with sensor data (e.g., video data, audio data, interpretations of accelerometer data, etc.) and receiving a sensor data label indication from the user. Database 310 stores sensor data 312 associated with sensor data labels 314. Processor 304 additionally comprises model builder 308 for building a model, (e.g., a lane departure behavior model). In various embodiments, model builder 308 builds a model by training a machine learning model or a neural network. Model builder 308 builds the model utilizing sensor data 312 associated with sensor data labels 314. The built model is transmitted to a vehicle event recorder, via the communications network and interface 302.

Figure 4:
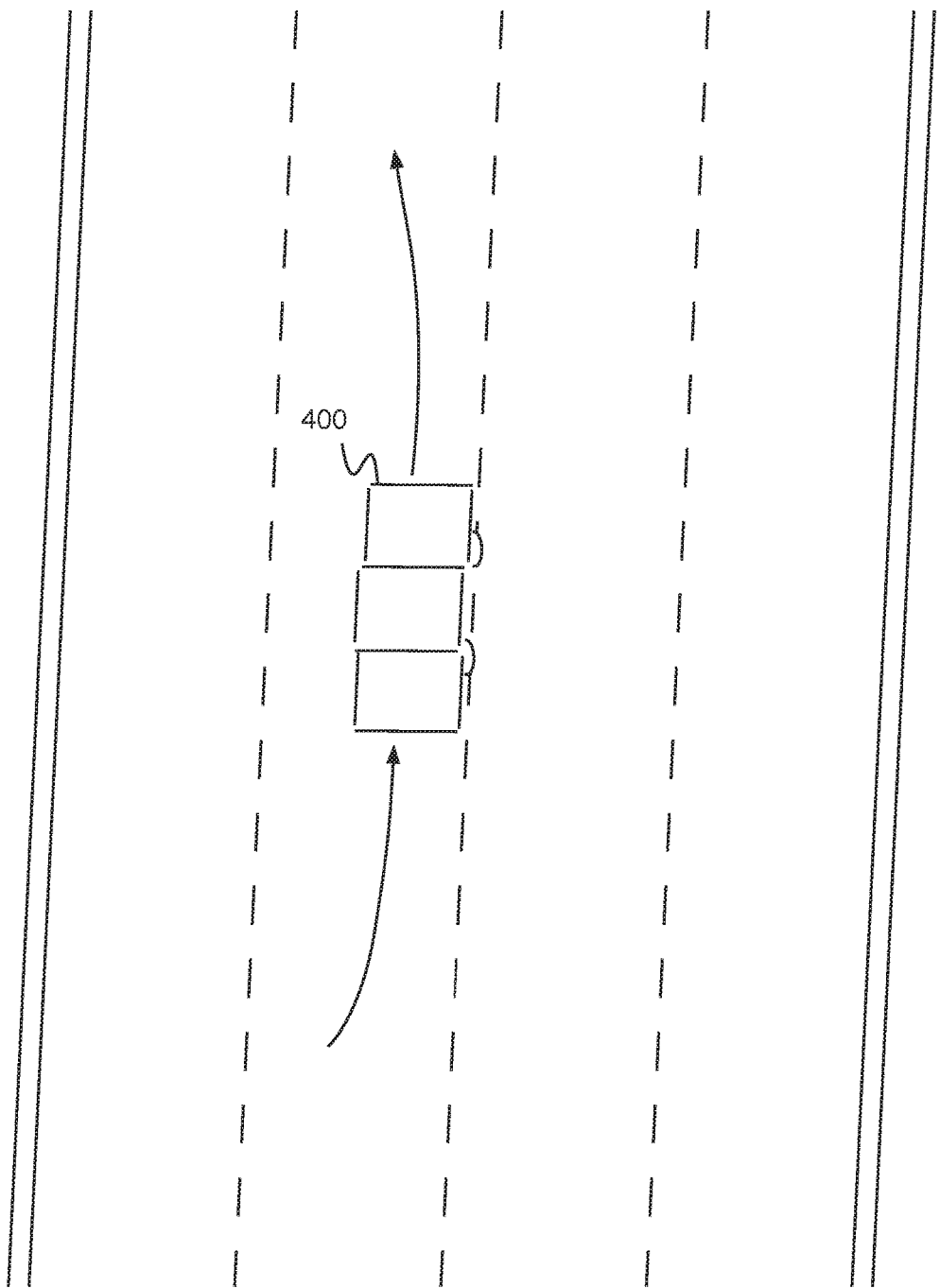
FIG. 4 is a diagram illustrating an embodiment of a lane departure.

FIG. 4 is a diagram illustrating an embodiment of a lane departure. In some embodiments, vehicle 400 comprises vehicle 106 of FIG. 1 (e.g., a vehicle including a mounted vehicle event recorder). In the example shown, vehicle 400 performs a lane departure. Vehicle 400 moves out of the correct position in the lane until it encounters the lane marker. The driver then realizes that the vehicle is out of the correct lane position, and corrects the position within the lane. A vehicle event recorder mounted on vehicle 400 is able to detect the lane departure, for example, based at least in part on video data, GPS data, accelerometer data, gyroscope data, etc. A determination is then made whether the lane departure is a result of a bad behavior (e.g., using a handheld cell phone, using a hands free cell phone, eating, drinking, drowsy, falling asleep, spacing out, etc.). The vehicle event recorder is configured to store a bad behavior indication in a database system in response to the lane departure behavior indicating a bad behavior. In various embodiments, the vehicle event recorder is configured to respond in any other appropriate way in response to the lane departure behavior indicating a bad behavior (e.g., alert a driver using an audio alert, alert a driver using a haptic alert, alert a manager, modify a driver score, modify warning thresholds, modify event detection thresholds, etc.).

Figure 5:
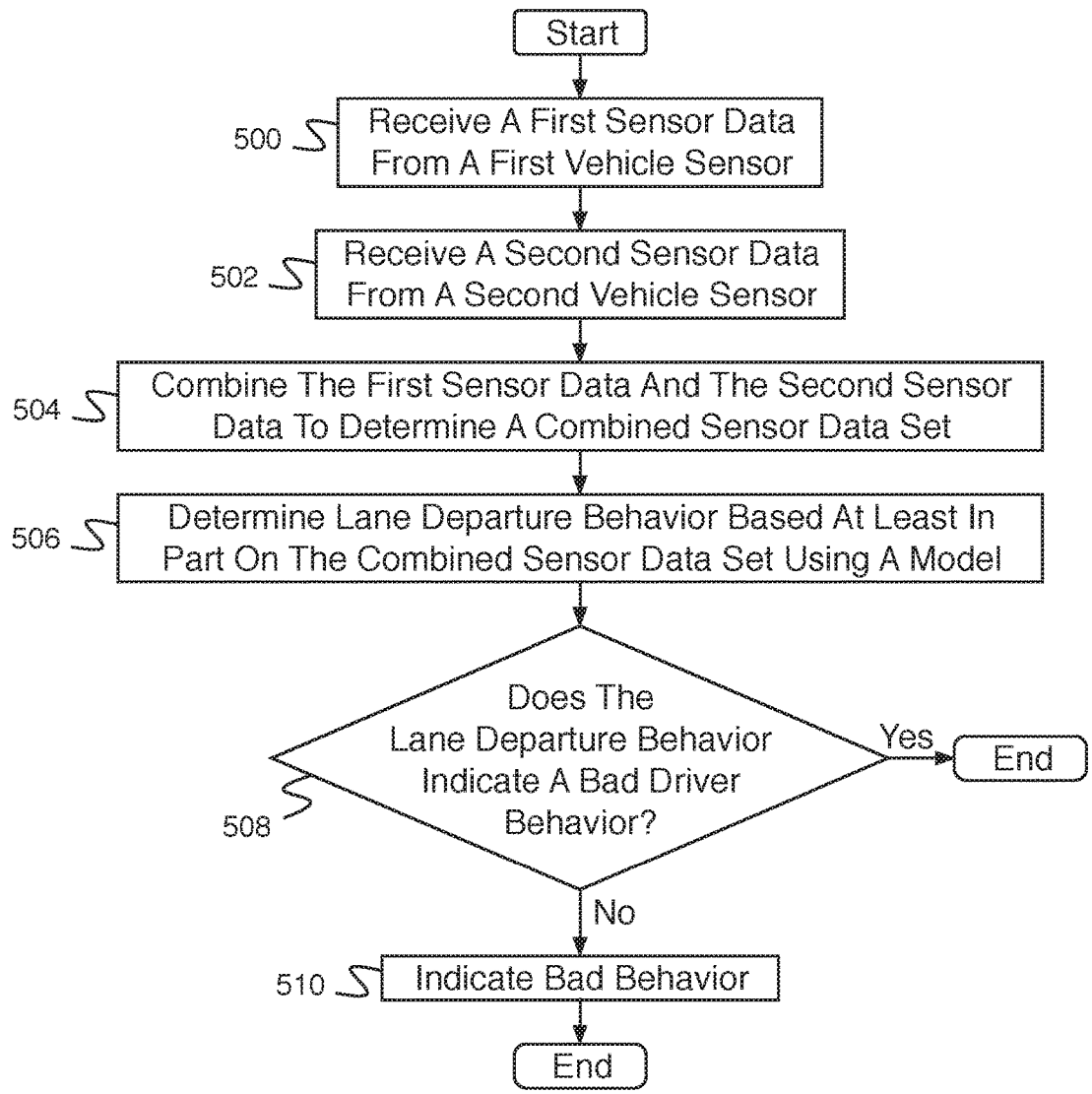
FIG. 5 is a flow diagram illustrating an embodiment of a process for identifying an inappropriate driving behavior.

FIG. 5 is a flow diagram illustrating an embodiment of a process for identifying an inappropriate driving behavior. In some embodiments, the process of FIG. 5 is executed by a vehicle event recorder (e.g., vehicle event recorder 102 of FIG. 1). In the example shown, in 500, a first sensor data is received from a first vehicle sensor. For example, the first sensor data comprises video data, GPS data, LIDAR data, RADAR data, accelerometer data, or gyroscope data. In 502, a second sensor data is received from a second vehicle sensor. For example, the second sensor data comprises video data, GPS data, LIDAR data, RADAR data, accelerometer data, or gyroscope data. In 504, the first sensor data and the second sensor data are combined to determine a combined sensor data set. In 506, lane departure behavior is determined based at least in part on the combined sensor data set using a model. In 508, it is determined whether the lane departure behavior indicates a bad driver behavior. In the event it is determined that the lane departure behavior does not indicate a bad driver behavior, the process ends. In the event it is determined that the lane departure behavior indicates a bad driver, control passes to 510. In 510, bad behavior is indicated. Indicating a bad behavior comprises storing a bad behavior indication in a database system. In various embodiments, indicating a bad behavior comprises alerting a driver using an audio alert, alerting a driver using a haptic alert, alerting a manager, modifying a driver score, modifying warning thresholds, modifying event detection thresholds, or indicating a bad behavior in any other appropriate way.

Figure 6:
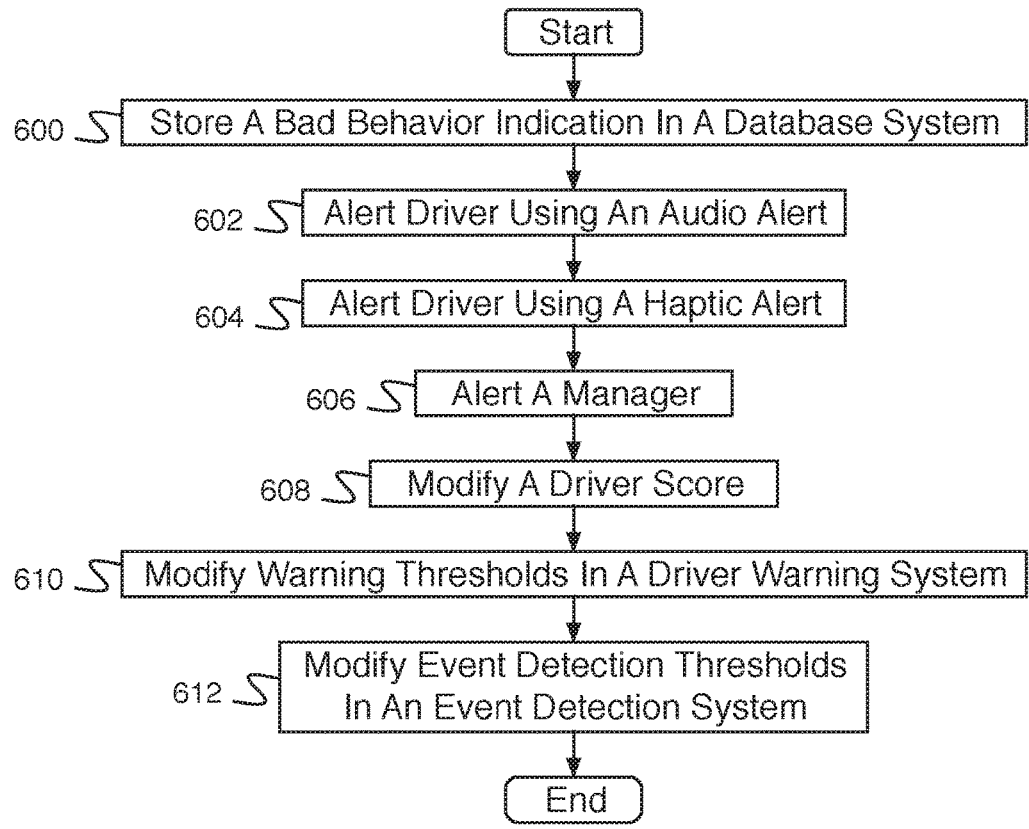
FIG. 6 is a flow diagram illustrating an embodiment of a process for indicating bad behavior.

FIG. 6 is a flow diagram illustrating an embodiment of a process for indicating bad behavior. In some embodiments, the process of FIG. 6 implements 510 of FIG. 5. In some embodiments, a subset of the steps of FIG. 6 are used to implement 510 of FIG. 5. For example, one step of FIG. 6 is used, two steps of FIG. 6 are used, etc. In the example shown, in 600, a bad behavior indication is stored in a database system. In 602, a driver is alerted using an audio alert. In 604, a driver is alerted using a haptic alert. In 606, a manager is alerted. In 608, a driver score is modified. In 610, warning thresholds in a driver warning system are modified. In 612, event detection thresholds in an event detection system are modified.

Figure 7:
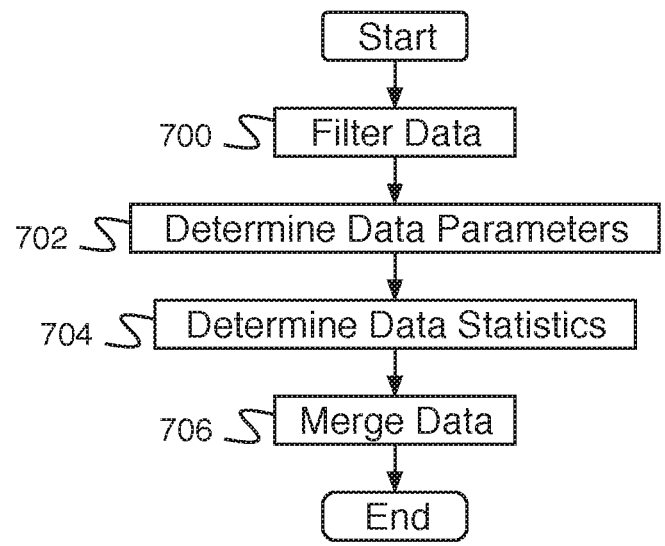
FIG. 7 is a flow diagram illustrating an embodiment of a process for combining first sensor data and second sensor data to determine a combined data set.

FIG. 7 is a flow diagram illustrating an embodiment of a process for combining first sensor data and second sensor data to determine a combined data set. In some embodiments, the process of FIG. 7 implements 504 of FIG. 5. In the example shown, in 700, data is filtered. For example, data is filtered using a Kalman filter, a low-pass filter, a bandpass filter, a high-pass filter, a denoising filter, etc. In 702, data parameters are determined. For example, data parameters comprise a lane departure distance, a lane departure time, or a lane marker consistency. In 704, data statistics are determined. For example, data statistics comprise lane width statistics, a lane width mean, a lane width variance, a lane width skewness, a lane width kurtosis, a lane curvature mean, a lane curvature variance, a mean of a lane marker yaw difference, a variance of a lane marker yaw difference, a GPS-determined speed mean, a GPS-determined speed variance, a GPS-determined heading variance, etc. In 706, data is merged.

In some embodiments, combining first sensor data and second sensor data to determine a combined set data set comprises processing sensor data (e.g., filtering data, determining data parameters, determining data statistics, merging data).

Figure 8:
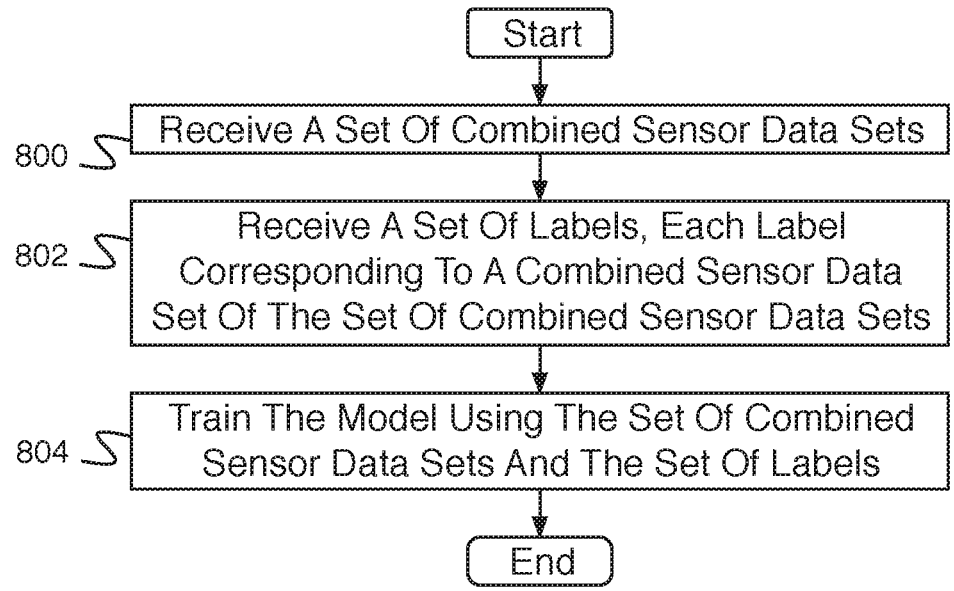
FIG. 8 is a flow diagram illustrating an embodiment of a process for training a model.

FIG. 8 is a flow diagram illustrating an embodiment of a process for training a model. In some embodiments, the process of FIG. 8 is executed by a model builder (e.g., model builder 308 of FIG. 3). In some embodiments, the process of FIG. 8 is used to train a lane departure behavior model. In the example shown, in 800, a set of combined sensor data sets is received. In 802, a set of labels is received, each label corresponding to a combined sensor data set of the set of combined sensor data sets. In 804, the model is trained using the set of combined sensor data sets and the set of labels.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for identifying an inappropriate driving behavior, comprising:
an interface configured to:
receive a first sensor data from a first vehicle sensor; and
receive a second sensor data from a second vehicle sensor; and
a processor configured to:
combine the first sensor data and the second sensor data to determine a combined sensor data set;
determine a lane departure behavior based at least in part on the combined sensor data set using a model; and
in response to the lane departure behavior indicating a bad behavior:
apply one or more labels to the combined sensor data set to obtain a labeled combined sensor data set, wherein labels of the one or more labels comprise bad behavior indication types; and
store a bad behavior indication and the labeled combined sensor data set in a database system, wherein the model is trained using the labeled combined sensor data set.

2. The system of claim 1, wherein the first sensor data comprises one of: video data, GPS data, LIDAR data, RADAR data, accelerometer data, or gyroscope data.

3. The system of claim 1, wherein the second sensor data comprises one of: video data, GPS data, LIDAR data, RADAR data, accelerometer data, or gyroscope data.

4. The system of claim 1, wherein the processor is additionally configured to alert a driver using an audio alert in response to the lane departure behavior indicating the bad behavior.

5. The system of claim 1, wherein the processor is additionally configured to alert a driver using a haptic alert in response to the lane departure behavior indicating the bad behavior.

6. The system of claim 1, wherein the processor is additionally configured to alert a manager in response to the lane departure behavior indicating the bad behavior.

7. The system of claim 1, wherein the processor is additionally configured to modify a driver score in response to the lane departure behavior indicating the bad behavior.

8. The system of claim 1, wherein the processor is additionally configured to modify warning thresholds in a driver warning system in response to the lane departure behavior indicating the bad behavior.

9. The system of claim 1, wherein the processor is additionally configured to modify an event detection threshold in an event detection system in response to the lane departure behavior indicating the bad behavior.

10. The system of claim 1, wherein combining the first sensor data and the second sensor data comprises processing the first sensor data or the second sensor data.

11. The system of claim 10, wherein processing the first sensor data or the second sensor data comprises processing the first sensor data or the second sensor data using a Kalman filter.

12. The system of claim 10, wherein processing the first sensor data or the second sensor data comprises computing a lane width statistic from video data.

13. The system of claim 12, wherein the lane width statistic comprises a lane width mean, a lane width variance, a lane width skewness, a lane width kurtosis, a lane curvature mean, a lane curvature variance, a mean of a lane marker yaw difference, or a variance of a lane marker yaw difference.

14. The system of claim 10, wherein processing the first sensor data or the second sensor data comprises determining a lane departure distance, determining a lane departure time, determining a lane marker consistency, determining a GPS-determined speed mean, determining a GPS-determined speed variance, or determining a GPS-determined heading variance.

15. The system of claim 1, wherein the model comprises an analytical model, a machine learning model, or a neural network model.

16. The system of claim 1, wherein the processor is further configured to train the model.

17. The system of claim 1, wherein a type of the bad behavior indication comprise using a handheld cell phone, using a hands free cell phone, eating, drinking, being drowsy, falling asleep, and spacing out.

18. The system of claim 1, wherein the first sensor data and the second sensor data are combined in response to a determination of a lane departure event.

19. A method for identifying an inappropriate driving behavior, comprising:
   receiving a first sensor data from a first vehicle sensor;
   receiving a second sensor data from a second vehicle sensor;
   combining, using a processor, the first sensor data and the second sensor data to determine a combined sensor data set;
   determining a lane departure behavior based at least in part on the combined sensor data set using a model; and
   in response to the lane departure behavior indicating a bad behavior:
      applying one or more labels to the combined sensor data set to obtain a labeled combined sensor data set, wherein labels of the one or more labels comprise bad behavior indication types; and
      storing a bad behavior indication and the labeled combined sensor data set in a database system, wherein the model is trained using the labeled combined sensor data set.

20. A computer program product for identifying an inappropriate driving behavior, the computer program product being embodied in a non-transitory computer readable storage medium and comprising computer instructions for:
   receiving a first sensor data from a first vehicle sensor;
   receiving a second sensor data from a second vehicle sensor;
   combining the first sensor data and the second sensor data to determine a combined sensor data set;
   determining a lane departure behavior based at least in part on the combined sensor data set using a model; and
   in response to the lane departure behavior indicating a bad behavior:
      applying one or more labels to the combined sensor data set to obtain a labeled combined sensor data set, wherein labels of the one or more labels comprise bad behavior indication types; and
      storing a bad behavior indication and the labeled combined sensor data set in a database system, wherein the model is trained using the labeled combined sensor data set.

* * * * *